United States Patent
Taipale et al.

(10) Patent No.: US 12,399,275 B2
(45) Date of Patent: Aug. 26, 2025

(54) SYSTEMS AND METHODS FOR GENERATING A REDUCED-MEMORY TEMPLATE SIGNAL FOR USE IN AN ULTRASONIC ACTIVITY DETECTION DEVICE

(71) Applicant: Cirrus Logic International Semiconductor Ltd., Edinburgh (GB)

(72) Inventors: Dana J. Taipale, Austin, TX (US); Meena Matai, Austin, TX (US)

(73) Assignee: Cirrus Logic Inc., Austin, TX (US)

( * ) Notice: Subject to any disclaimer, the term of this patent is extended or adjusted under 35 U.S.C. 154(b) by 60 days.

(21) Appl. No.: 18/210,856

(22) Filed: Jun. 16, 2023

(65) Prior Publication Data
US 2024/0012140 A1    Jan. 11, 2024

Related U.S. Application Data

(60) Provisional application No. 63/359,583, filed on Jul. 8, 2022.

(51) Int. Cl.
*G01S 15/04* (2006.01)
(52) U.S. Cl.
CPC .................... *G01S 15/04* (2013.01)
(58) Field of Classification Search
CPC ........................................................ G01S 15/04
See application file for complete search history.

(56) References Cited

U.S. PATENT DOCUMENTS

| | | | |
|---|---|---|---|
| 6,806,820 B1* | 10/2004 | Dhalla | H04B 1/406 341/110 |
| 7,292,164 B1 | 11/2007 | Wegener | |
| 2006/0271317 A1 | 11/2006 | Ammerman et al. | |
| 2010/0305449 A1 | 12/2010 | Wegener et al. | |
| 2010/0331689 A1 | 12/2010 | Wegener et al. | |
| 2014/0236533 A1* | 8/2014 | Drachmann | G01F 1/662 73/861.27 |
| 2020/0340955 A1 | 10/2020 | Wegner | |
| 2020/0400802 A1* | 12/2020 | Zhang | G01S 7/52092 |
| 2021/0044906 A1 | 2/2021 | Lesso et al. | |
| 2024/0045044 A1* | 2/2024 | van Rens | G01S 7/52034 |

FOREIGN PATENT DOCUMENTS

GB    2325823 A    12/1998
WO    2019130103 A1    7/2019

OTHER PUBLICATIONS

Combined Search and Examination Report under Sections 17 and 18(3), UKIPO, Application No. GB2309151.5, mailed Dec. 8, 2023.
Combined Search and Examination Report under Sections 17 and 18(3), UKIPO, Application No. GB2413742.4, dated Mar. 17, 2025.

* cited by examiner

Primary Examiner — Daryl C Pope
(74) Attorney, Agent, or Firm — Jackson Walker L.L.P.

(57) ABSTRACT

A method for generating a signal for a device process may include retrieving a reduced-memory template signal centered on a chosen subharmonic of a reconstruction sample rate, upsampling the reduced-memory template signal to generate the signal for the device process at a desired data rate, and communicating the signal to a transducer for playback by the transducer.

18 Claims, 7 Drawing Sheets

SYSTEMS AND METHODS FOR GENERATING A REDUCED-MEMORY TEMPLATE SIGNAL FOR USE IN AN ULTRASONIC ACTIVITY DETECTION DEVICE

RELATED APPLICATION

The present application claims priority to U.S. Provisional Patent Application No. 63/359,583 filed Jul. 8, 2022, which is incorporated by reference herein in its entirety.

FIELD OF DISCLOSURE

The instant disclosure relates generally to processing systems, and more specifically, to generating a signal, for example a playback signal to a transducer device.

BACKGROUND

Devices including integrated circuits are often provided with stored signals for use in different functions. One example of such a stored signal is a signal for use in an ultrasonic activity detection device, wherein a probe or chirp signal may be transmitted by a transducer (e.g., a loudspeaker) and any reflections are detected by a microphone and monitored to detect motion of a person or other object proximate to the transducer. Limitations on memory size may present challenges for effective storage and retrieval from memory of such signals, sometimes requiring a hardware modulator or other processing to accurately recreate a desired signal.

Accordingly, systems and methods that enable more efficient signal storage and retrieval of such playback signals, as compared to existing approaches, may be desirable.

SUMMARY

In accordance with the teachings of the present disclosure, certain disadvantages and problems associated with existing approaches to storage and retrieval of playback signals may be reduced or eliminated.

In accordance with embodiments of the present disclosure, a method for generating a signal for a device process may include retrieving a reduced-memory template signal centered on a chosen subharmonic of a reconstruction sample rate, upsampling the reduced-memory template signal to generate the signal for the device process at a desired data rate, and communicating the signal to a transducer for playback by the transducer.

In accordance with these and other embodiments of the present disclosure, a method for generating a reduced-memory template signal may include demodulating an original signal at a demodulation frequency to generate a demodulated signal, downsampling the demodulated signal to generate the reduced memory template signal, and storing the reduced-memory template signal in memory for later retrieval and reconstruction of the signal.

In accordance with these and other embodiments of the present disclosure, a method may include determining one or more conditions associated with a system, determining based on the one or more conditions whether to generate a signal for a device process from a waveform stored in a memory of the system or to synthesize the signal for the device process with a processor of the system, generating the signal for the device process from the waveform stored in the memory of the system in response to determining based on the one or more conditions to generate the signal for the device process from the waveform stored in the memory of the system, and synthesizing the signal for the device process with the processor of the system in response to determining based on the one or more conditions to synthesize the signal for the device process with the processor of the system.

In accordance with these and other embodiments of the present disclosure, a system for generating a signal for a device process may include a memory configured to store a reduced-memory template signal centered on a chosen subharmonic of a reconstruction sample rate and a processor configured to upsample the reduced-memory template signal to generate the signal for the device process at a desired data rate and communicate the signal to a transducer for playback by the transducer.

In accordance with these and other embodiments of the present disclosure, a system for generating a reduced-memory template signal may include a memory and a processor configured to demodulate an original signal at a demodulation frequency to generate a demodulated signal, downsample the demodulated signal to generate the reduced memory template signal, and store the reduced-memory template signal in memory for later retrieval and reconstruction of the signal.

In accordance with these and other embodiments of the present disclosure, a system may include a memory and a processor configured to determine one or more conditions associated with a system, determine based on the one or more conditions whether to generate a signal for a device process from a waveform stored in the memory or to synthesize the signal for the device process with the processor, generate the signal for the device process from the waveform stored in the memory in response to determining based on the one or more conditions to generate the signal for the device process from the waveform stored in the memory of the system, and synthesize the signal for the device process with the processor in response to determining based on the one or more conditions to synthesize the signal for the device process with the processor of the system.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
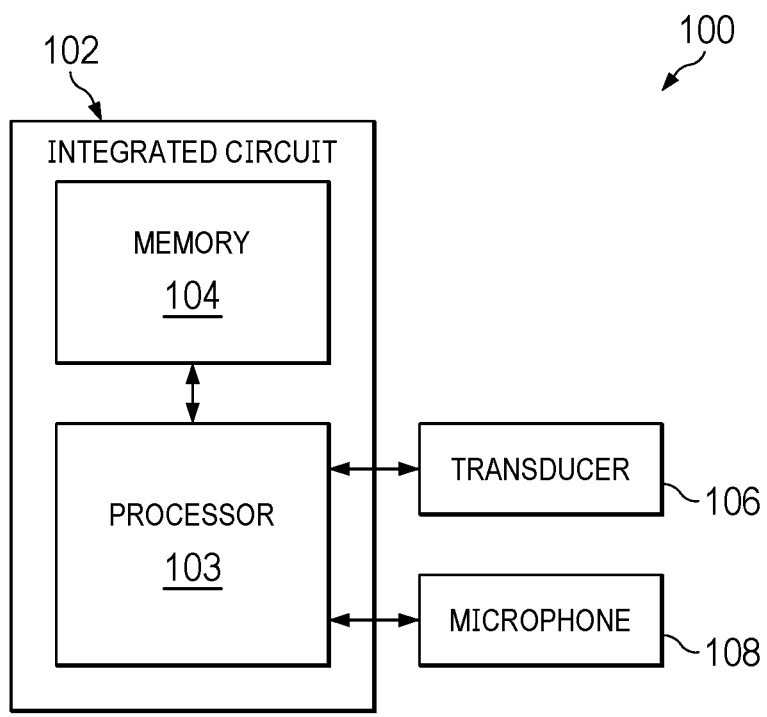
FIG. 1 illustrates a block diagram of selected components of an example ultrasonic activity detection device, in accordance with embodiments of the present disclosure.

FIG. 1 illustrates a block diagram of selected components of an example ultrasonic activity detection device 100, in accordance with embodiments of the present disclosure. As shown in FIG. 1, ultrasonic activity detection device 100 may include an integrated circuit 102 comprising a processor 103 and a memory 104 communicatively coupled to processor 103, a transducer 106 communicatively coupled to processor 103, and a microphone 108 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a storage resource, memory 104, and/or another component of ultrasonic activity detection device 100. In some embodiments, processor 103 may be embodied by multiple processors, for example one processor coupled to transducer 106 and configured to communicate a playback signal to transducer 106 and another processor coupled to microphone 108 for processing audio signals captured by microphone 108 and configured to determine presence or proximity of motion as is described in greater detail below.

Memory 104 may be communicatively coupled to processor 103 and may comprise any system, device, or apparatus operable to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to ultrasonic activity detection device 100 is turned off. In particular embodiments, memory 104 may comprise dynamic random access memory (DRAM).

Transducer 106 may be communicatively coupled to processor 103 and may comprise any system, device, or apparatus configured to convert energy from one form to another. In particular, transducer 106 may be configured to convert electrical energy into mechanical energy as a function of a playback signal delivered from processor 103 to transducer 106. In particular embodiments, transducer 106 may comprise a loudspeaker configured to convert electrical energy to acoustic energy, including within the ultrasonic frequency range.

Although transducer 106 is shown as coupled directly to processor 103 in FIG. 1, it is understood that other electrical and electronic components (e.g., amplifiers, digital-to-analog converters, etc.) may be interfaced between processor 103 and transducer 106 in order to condition the playback signal generated by processor 103 for playback to transducer 106. In addition, in some embodiments, some of such electrical and electronic components may be implemented within transducer 106 itself.

Microphone 108 may be communicatively coupled to processor 103 and may comprise any system, device, or apparatus configured to convert acoustic energy, including acoustic energy generated by transducer 106, into an electrical signal indicative of intensity and/or frequency of the acoustic energy. Microphone 108 may include an electrostatic microphone, a condenser microphone, an electret microphone, a microelectromechanical systems (MEMs) microphone, or any other suitable capacitive microphone.

In operation, processor 103 may be configured to communicate a probe or chirp signal to transducer 106 for playback by transducer 106, and processor 103 may further determine how much of such probe signal is reflected to microphone 108, which may indicate the presence of motion of a person or object proximate to ultrasonic activity detection device 100. In some embodiments, the probe signal may be in the ultrasonic range (e.g., significantly greater than 20 KHz) undetectable by the human ear.

Further, as described in greater detail below, processor 103 may generate the playback signal for transducer 106 from a stored waveform stored in memory 104 or by synthesizing a waveform for the playback signal (e.g., by using a trigonometric function). In some embodiments, processor 103 may be configured to choose, based on conditions associated with ultrasonic activity detection device 100, between generation of the playback signal from a waveform stored on memory 104 and generation of the playback signal using waveform synthesis. For example, such conditions may include available processing capacity of processor 103 and/or memory capacity of memory capacity 104. To illustrate, if available processing capacity is scarce, processor 103 may be more likely to generate the playback signal from a waveform stored in memory 104 rather than use scarce processing resources to synthesize a waveform for playback. On the other hand, if available memory capacity is scarce, processor 103 may be more likely to generate the playback signal using waveform synthesis rather than use scarce memory resources to store a waveform for retrieval and playback.

Figure 2:
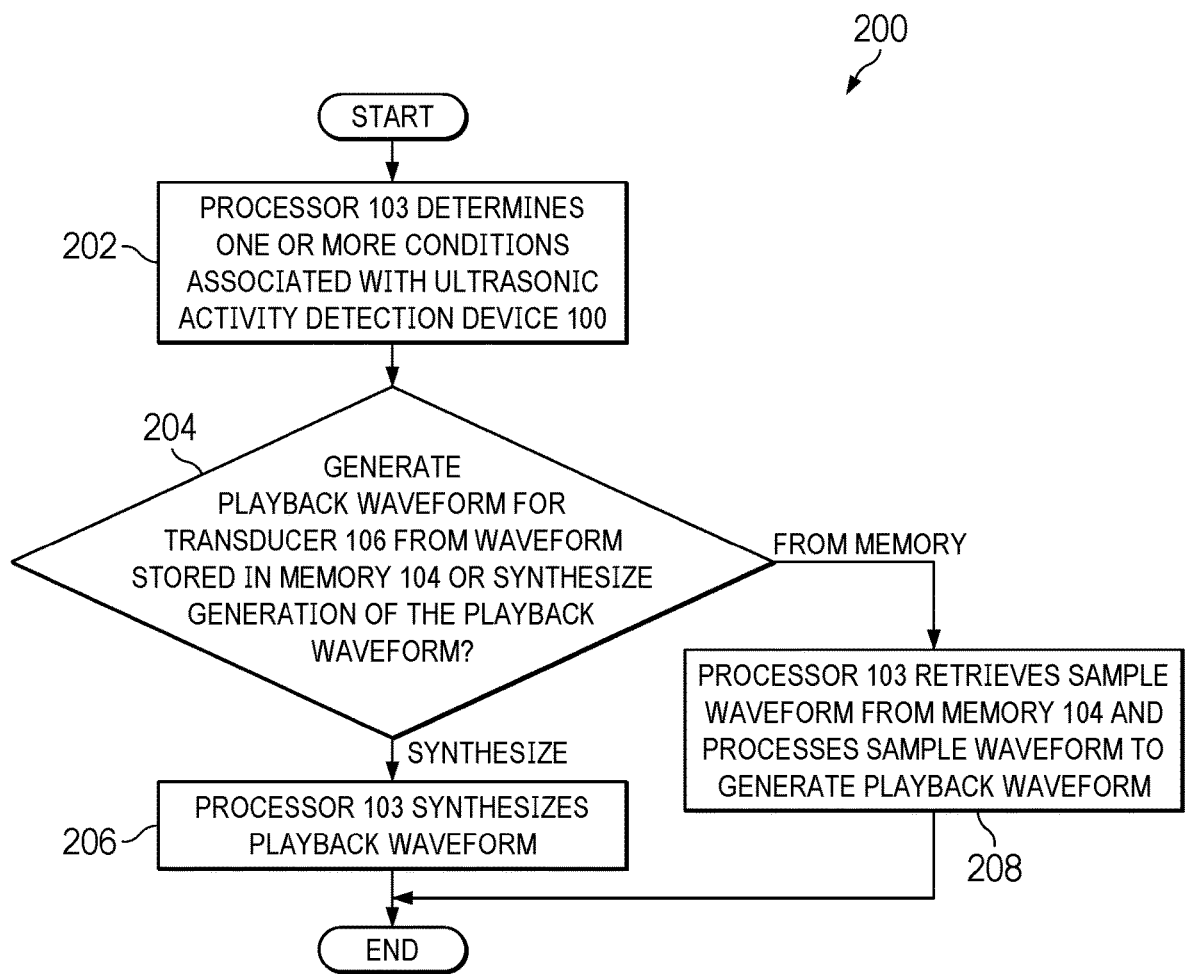
FIG. 2 illustrates a flow chart of an example method for determining how to generate a playback waveform signal for playback to a transducer, in accordance with embodiments of the present disclosure.

FIG. 2 illustrates a flow chart of an example method 200 for determining how to generate a playback waveform signal for playback to transducer 106, in accordance with embodiments of the present disclosure. According to some embodiments, method 200 may begin at step 202. As noted above, teachings of the present disclosure may be implemented in a variety of configurations of ultrasonic activity detection device 100. As such, the preferred initialization point for method 200 and the order of the steps comprising method 200 may depend on the implementation chosen.

At step 202, processor 103 may determine one or more conditions associated with ultrasonic activity detection device 100, including without limitation available processing capacity of processor 103 and/or available memory capacity of memory 104. At step 204, based on the one or more conditions, processor 103 may determine whether to generate the playback waveform for transducer 106 from a waveform stored in memory 104 or to synthesize generation of the playback waveform.

If processor 103 determines to synthesize generation of the playback waveform, method 200 may proceed to step 206, wherein processor 103 may synthesize the playback waveform. In some embodiments, processor 103 may apply a trigonometric function to synthesize the playback waveform. For example, in particular embodiments, processor 103 may generate the playback waveform as a raised cosine pulse, such as $$\text{sinc}\left(\frac{t}{T}\right)\frac{\cos\left(\frac{\pi t}{T}\right)}{1-4(t^2/T^2)}\cos(2\pi f_c t).$$

After completion of step 206, method 200 may end.

If processor 103 determines to generate the playback waveform from a sample waveform stored in memory 104, method 200 may proceed to step 208, wherein processor 103 may retrieve the sample waveform from memory 104 and process the sample waveform to generate the playback waveform, for example as described in greater detail below with respect to FIGS. 7A and 7B. After completion of step 208, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using ultrasonic activity detection device 100 and/or any other system operable to implement method 200. In certain embodiments, method 200 may be implemented partially or fully in software and/or firmware embodied in computer-readable media.

Figure 3A:
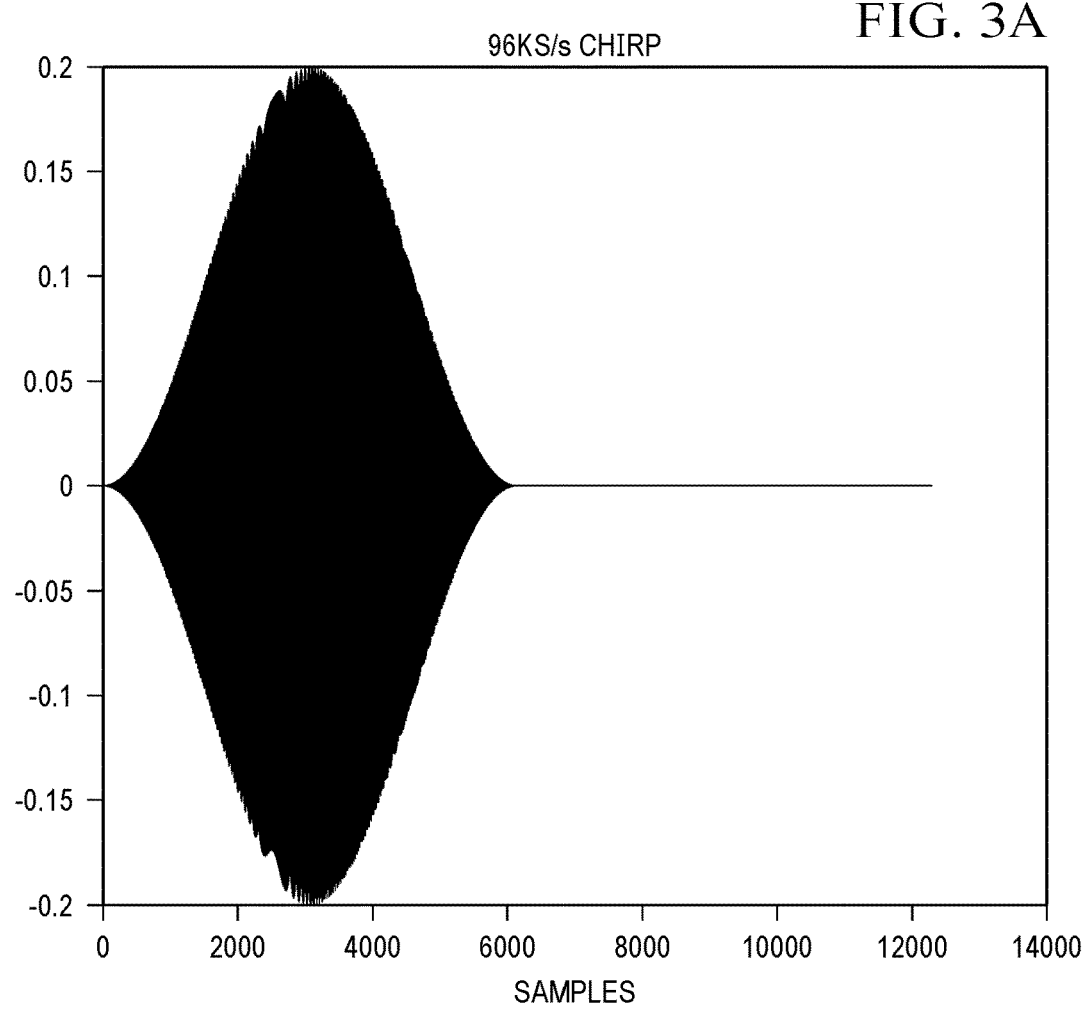
FIG. 3A illustrates a time-domain waveform of an example ultrasonic chirp signal which may be used as a playback signal generated by a processor for playback by a transducer, in accordance with embodiments of the present disclosure.
Figure 3B:
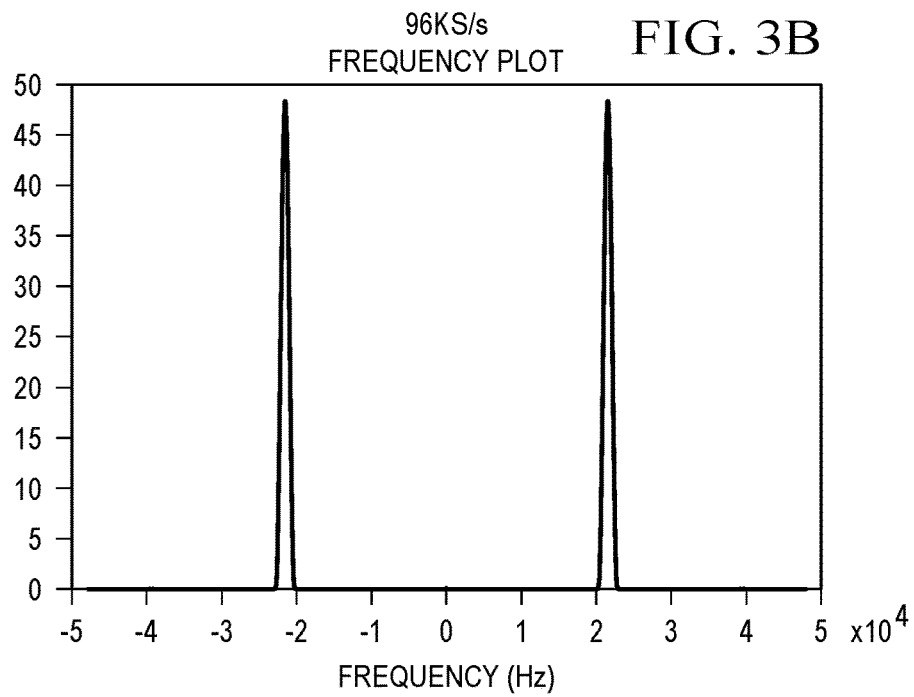
FIG. 3B illustrates the example ultrasonic chirp signal of FIG. 3A in the frequency domain, in accordance with embodiments of the present disclosure.

FIG. 3A illustrates a time-domain waveform of an example ultrasonic chirp signal which may be used as a playback signal generated by processor 103 for playback by transducer 106, in accordance with embodiments of the present disclosure. FIG. 3B illustrates the same example ultrasonic chirp signal in the frequency domain, in accordance with embodiments of the present disclosure. The example ultrasonic chirp signal is shown as being approximately 3 KHz in bandwidth with an ultrasonic frequency offset.

Figure 4:
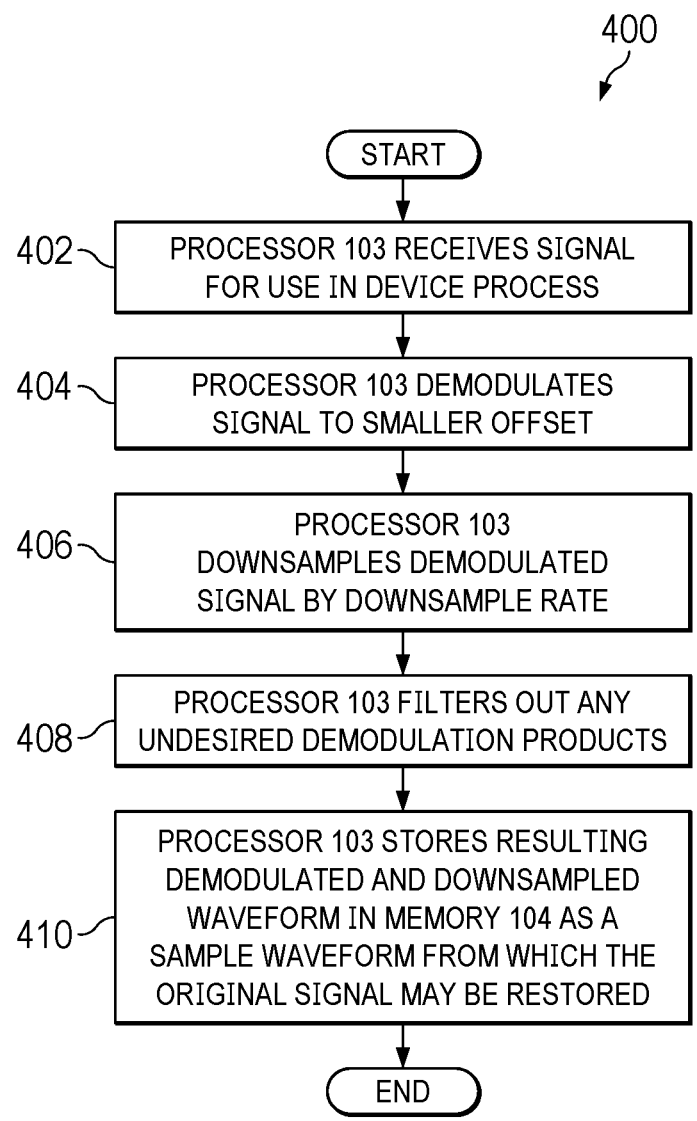
FIG. 4 illustrates a flow chart of an example method for generating a sample waveform for storage in a memory, in accordance with embodiments of the present disclosure.

FIG. 4 illustrates a flow chart of an example method 400 for generating a sample waveform for storage in memory 104, for later retrieval in order to generate a playback signal, in accordance with embodiments of the present disclosure. According to some embodiments, method 400 may begin at step 402. As noted above, teachings of the present disclosure may be implemented in a variety of configurations of ultrasonic activity detection device 100. As such, the preferred initialization point for method 400 and the order of the steps comprising method 400 may depend on the implementation chosen.

At step 402, processor 103 may receive a signal for use in a device process, for example a transducer playback signal such as the ultrasonic chirp signal shown in FIGS. 3A and 3B. At step 404, processor 103 may demodulate the signal to a smaller offset. The demodulation frequency used by processor 103 may be a carefully chosen subharmonic of the desired reconstruction sample rate, chosen so that later upsampling (described below with respect to method 600) may center the template at the final desired frequency. The demodulation frequency may be chosen to be an integer multiple of the original sampling frequency divided by a downsample rate, which may minimize a baseband bandwidth of the resulting signal in order to avoid overlap. At step 406, processor 103 may downsample the demodulated signal by the downsample rate. At step 408, processor 103 may filter out any undesired demodulation products. At step 410, processor 103 may store the resulting demodulated and downsampled waveform in memory 104 as a sample waveform from which the original signal may be restored by reversing the steps taken in method 400, as described in greater detail below. After completion of step 410, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

Method 400 may be implemented using ultrasonic activity detection device 100 and/or any other system operable to implement method 400. In certain embodiments, method 400 may be implemented partially or fully in software and/or firmware embodied in computer-readable media. It is understood that in some embodiments, method 400 may be performed offline or as a preprocessing step on another device other than ultrasonic activity detection device 100 and stored for later retrieval by processor 103.

Figure 5A:
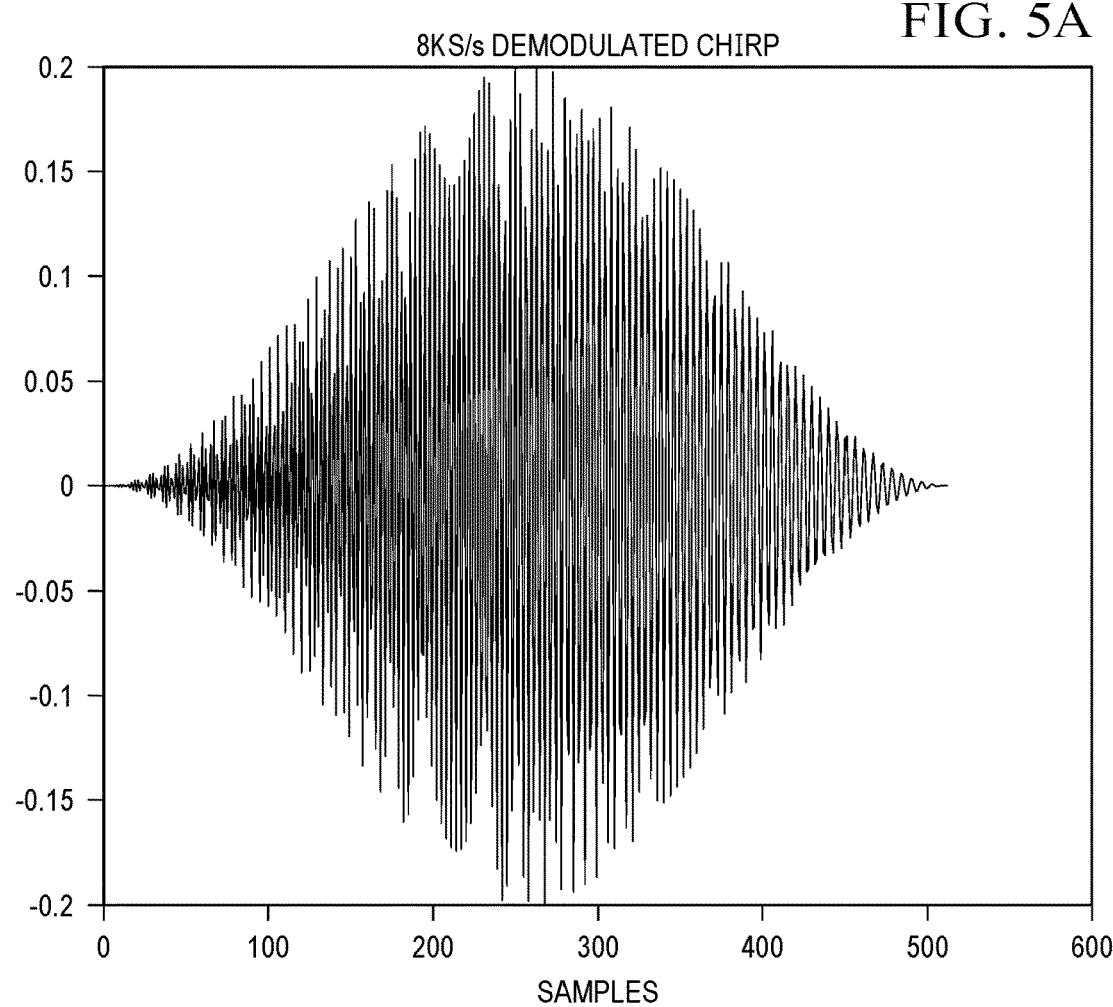
FIG. 5A illustrates a time-domain waveform of a template signal resulting from demodulation and downsampling of the example ultrasonic chirp signal of FIGS. 3A and 3B, in accordance with embodiments of the present disclosure.
Figure 5B:
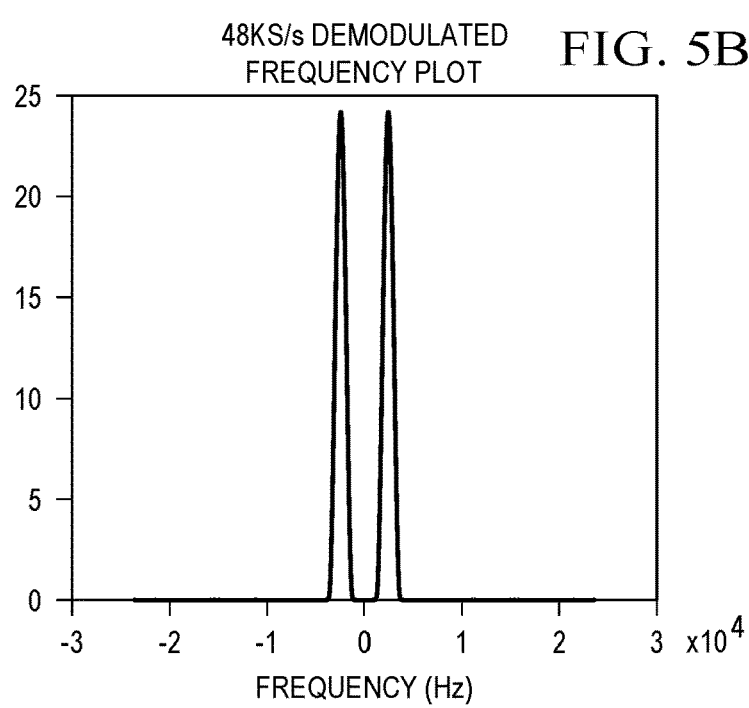
FIG. 5B illustrates the example ultrasonic chirp signal of FIG. 5A in the frequency domain, in accordance with embodiments of the present disclosure.

To illustrate, if method 400 were applied to the example ultrasonic chirp signal shown in FIGS. 3A and 3B, downsample rates larger than 8 may not be used, because at least 6 KHz sample rates may be required to satisfy the Nyquist ratio, due to the 3 KHz bandwidth of the depicted signal. A downsample rate of 6 may be the largest downsample rate that avoids signal distortion. The corresponding Nyquist rate of 24 KHz may be used as a demodulation tone frequency and may have a sample rate of 8 KHz to accommodate the signal, resulting in an effective bandwidth of 4 KHz due to the demodulation tone offset. FIG. 5A illustrates a time-domain waveform of the resulting template signal, in accordance with embodiments of the present disclosure. FIG. 5B illustrates the same example template signal in the frequency domain, in accordance with embodiments of the present disclosure. The template signal may require 512 samples for storage in memory 104.

Figure 6:
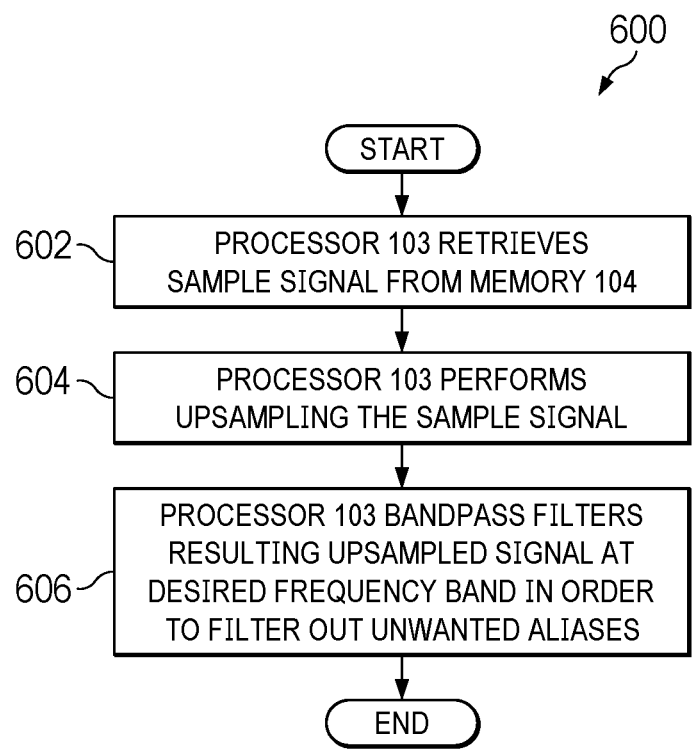
FIG. 6 illustrates a flow chart of an example method for restoring a signal from a template signal stored in memory, in accordance with embodiments of the present disclosure.

FIG. 6 illustrates a flow chart of an example method 600 for restoring a signal from a template signal stored in memory 104, in accordance with embodiments of the present disclosure. According to some embodiments, method 600 may begin at step 602. As noted above, teachings of the present disclosure may be implemented in a variety of configurations of ultrasonic activity detection device 100. As such, the preferred initialization point for method 600 and the order of the steps comprising method 600 may depend on the implementation chosen.

At step 602, processor 103 may retrieve the template signal from memory 104. At step 604, processor 103 may perform upsampling of the template signal at an integer multiple of the sampling frequency of the template signal to provide a resulting signal at a desired data rate. In some embodiments, the upsample rate may be twice the downsampling rate used to create the template signal. At step 606, processor 103 may bandpass filter the resulting upsampled signal at a desired frequency band in order to filter out unwanted aliases. For example, an elliptic filter may be used to recover the original signal at the desired frequency. After completion of step 606, method 600 may end.

Although FIG. 6 discloses a particular number of steps to be taken with respect to method 600, method 600 may be executed with greater or fewer steps than those depicted in FIG. 6. In addition, although FIG. 6 discloses a certain order of steps to be taken with respect to method 600, the steps comprising method 600 may be completed in any suitable order.

Method 600 may be implemented using ultrasonic activity detection device 100 and/or any other system operable to implement method 600. In certain embodiments, method 600 may be implemented partially or fully in software and/or firmware embodied in computer-readable media.

Figure 7A:
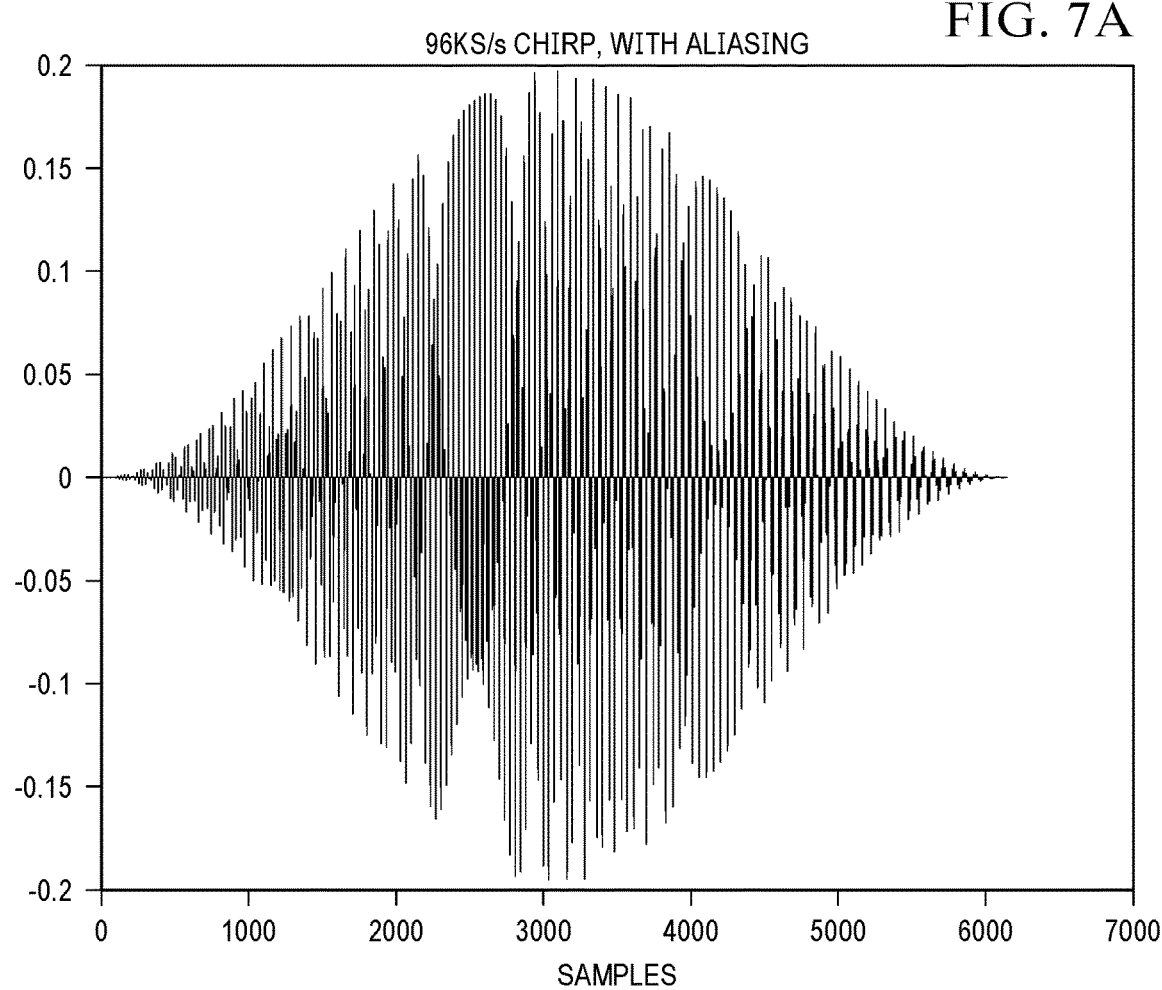
FIG. 7A illustrates a time-domain waveform of a signal upsampled from the example template signal of FIGS. 5A and 5B, in accordance with embodiments of the present disclosure.
Figure 7B:
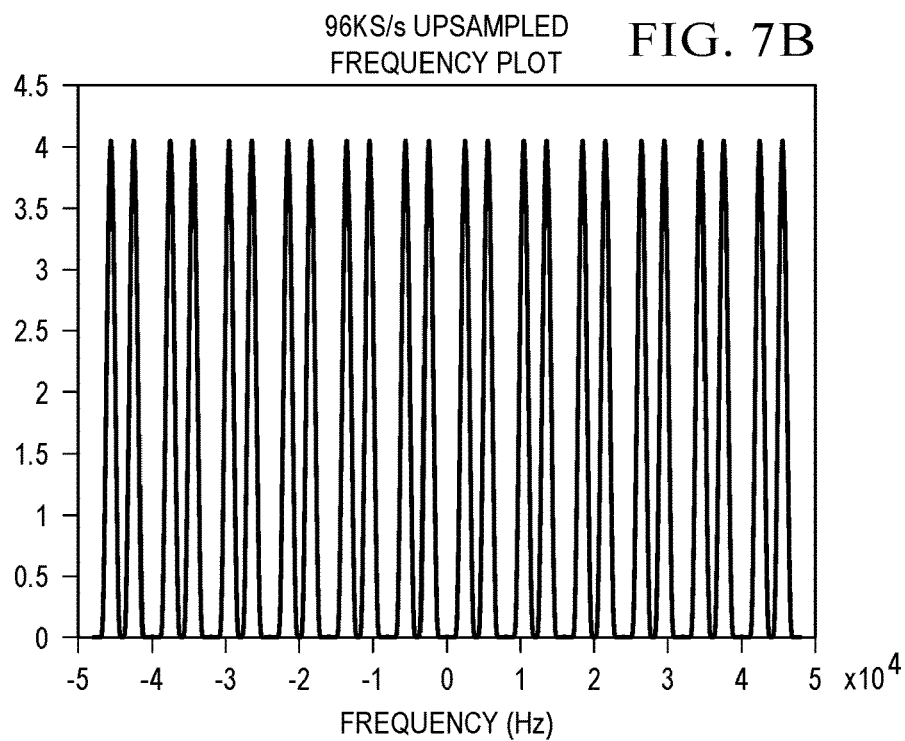
FIG. 7B illustrates the example signal of FIG. 7A in the frequency domain, in accordance with embodiments of the present disclosure.

FIGS. 7A and 7B illustrate a time-domain waveform and frequency-domain representation, respectively, resulting from upsampling, in accordance with method 600, the example template signal shown in FIGS. 5A and 5B at an upsampling rate of 12. As described above with respect to step 606 of method 600, processor 103 may perform filtering within a desired bandwidth, in order to filter out unwanted aliases at other frequencies and restore the ultrasonic chirp signal shown in FIGS. 3A and 3B. A $10^{th}$-order filter may be used in the illustrated example.

In some embodiments, the level of filtering performed at step 606 may be reduced in order to require fewer processing resources, and any distortion resulting from the reduced filtering may be accounted for by the receiver of the reconstructed signal (e.g., transducer 106). In these and other embodiments, filtering at step 606 may be reduced and the processor 103 may pre-emphasize the stored template signal such that the reduced filtering and pre-emphasized signal substantially correlate to the expected, original signal.

Although the foregoing contemplates creating a reduced-memory template signal from an ultrasonic chirp signal to be used in an ultrasonic activity detection device, it is understood that the systems and methods described herein may be applied to any suitable signal used for any process in any suitable device. Further, although the foregoing contemplates generation of a playback signal for a loudspeaker, the systems and methods described herein may be applied to a playback signal for any suitable transducer or any other suitable signal used for a device process.

The operations described above may be performed by a processor or any other circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general-purpose processor (e.g., CPU or DSP) capable of executing instructions contained in software. The firmware and/or software may include instructions that cause the processing of signals described herein to be performed. The circuitry or software may be organized as blocks that are configured to perform specific functions. Alternatively, some circuitry or software may be organized as shared blocks that can perform several of the described operations. In some embodiments, the IC that is the controller may include other functionality. For example, the controller IC may include an audio coder/decoder (CODEC) along with circuitry for performing the functions described herein. Such an IC is one example of an audio controller. Other audio functionality may be additionally or alternatively integrated with the IC circuitry described herein to form an audio controller.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks, and Blu-ray discs. Generally, disks reproduce data magnetically, and discs reproduce data optically. Combinations of the above should also be included within the scope of computer-readable media.

In addition to storage on computer readable media, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, where general purpose processors are described as implementing certain processing steps, the general purpose processor may be a digital signal processor (DSP), a graphics processing unit (GPU), a central processing unit (CPU), or other configurable logic circuitry. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A method for generating a reduced-memory template signal for use in an ultrasonic activity detection device comprising:
   demodulating an original signal at a demodulation frequency to generate a demodulated signal, wherein the demodulation frequency is a harmonic of an upsampling rate and is selected such that later upsampling of the demodulated signal at the upsampling rate generates a signal centred at a final frequency;
   downsampling the demodulated signal to generate the reduced memory template signal; and
   storing the reduced-memory template signal in memory for later retrieval and reconstruction of the original signal.

2. A method for generating a signal for use in an ultrasonic activity detection device, the method comprising:
   retrieving a reduced-memory template signal generated using the method of claim 1;
   upsampling the reduced-memory template signal to generate the signal; and
   communicating the signal to a transducer for playback by the transducer.

3. The method of claim 2, further comprising filtering the signal after the signal is upsampled and before communicating the signal to the transducer in order to remove undesired frequency components from the signal.

4. The method of claim 3, wherein upsampling comprises upsampling the reduced-memory template signal such that a portion of the signal lies within a desired signal band.

5. The method of claim 4, wherein filtering comprises bandlimiting the signal to remove aliasing components outside of the desired signal band.

6. The method of claim 2, wherein upsampling comprises upsampling at an integer multiple of a sampling frequency of the reduced-memory template signal.

7. The method of claim 2, wherein the signal is an ultrasonic chirp probe signal for ultrasonic activity detection.

8. The method of claim 1, wherein the demodulation frequency is selected to be an integer multiple of a sampling frequency of the original signal divided by a downsample rate used for downsampling.

9. The method of claim 1, wherein the original signal is an ultrasonic chirp probe signal for ultrasonic activity detection.

10. A system for generating a reduced-memory template signal for use in an ultrasonic activity detection device, the system comprising:
    a memory; and
    a processor configured to:
      demodulate an original signal at a demodulation frequency to generate a demodulated signal wherein the demodulation frequency is a harmonic of an upsampling rate and is selected such that later upsampling of the demodulated signal at the upsampling rate generates a signal centred at a final frequency;
      downsample the demodulated signal to generate the reduced memory template signal; and
      store the reduced-memory template signal in the memory for later retrieval and reconstruction of the original signal.

11. A system for generating a signal for use in an ultrasonic activity detection device, the system comprising:
    a memory configured to store a reduced-memory template signal generated using the system of claim 10; and a processor configured to:
- upsample the reduced-memory template signal to generate the signal; and
- communicate the signal to a transducer for playback by the transducer.

12. The system of claim 11, the processor further configured to filter the signal after the signal is upsampled and before communicating the signal to the transducer in order to remove undesired frequency components from the signal.

13. The system of claim 12, wherein upsampling comprises upsampling the reduced-memory template signal such that a portion of the signal lies within a desired signal band.

14. The system of claim 13, wherein filtering comprises bandlimiting the signal to remove aliasing components outside of the desired signal band.

15. The system of claim 11, wherein upsampling comprises upsampling at an integer multiple of a sampling frequency of the reduced-memory template signal.

16. The system of claim 11, wherein the signal is an ultrasonic chirp probe signal for ultrasonic activity detection.

17. The system of claim 10, wherein the demodulation frequency is selected to be an integer multiple of a sampling frequency of the original signal divided by a downsample rate used for downsampling.

18. The system of claim 10, wherein the original signal is an ultrasonic chirp probe signal for ultrasonic activity detection.

* * * * *